United States Patent
Sesia et al.

(10) Patent No.: US 9,531,448 B2
(45) Date of Patent: Dec. 27, 2016

(54) AUTONOMOUS QUASI CO-LOCATION STATUS REDEFINITION BY RECEIVER IN COORDINATED MULTIPOINT DOWNLINK

(71) Applicant: Telefonaktiebolaget L M Ericsson (publ), Stockholm (SE)

(72) Inventors: Stefania Sesia, Roquefort les Pins (FR); Stefano Sorrentino, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 12 days.

(21) Appl. No.: 14/761,129

(22) PCT Filed: Jan. 17, 2014

(86) PCT No.: PCT/SE2014/050050
§ 371 (c)(1),
(2) Date: Jul. 15, 2015

(87) PCT Pub. No.: WO2014/112938
PCT Pub. Date: Jul. 24, 2014

(65) Prior Publication Data
US 2015/0349855 A1    Dec. 3, 2015

Related U.S. Application Data

(60) Provisional application No. 61/753,685, filed on Jan. 17, 2013.

(51) Int. Cl.
*H04B 7/02*      (2006.01)
*H04W 24/08*   (2009.01)
(Continued)

(52) U.S. Cl.
CPC ............. *H04B 7/024* (2013.01); *H04L 5/0035* (2013.01); *H04L 5/0048* (2013.01);
(Continued)

(58) Field of Classification Search
CPC .... H04B 7/024; H04L 5/0048; H04L 25/0202; H04W 24/08; H04W 88/08; H04W 72/042; H04W 24/10; H04W 28/18
See application file for complete search history.

(56) References Cited

U.S. PATENT DOCUMENTS

| | | | |
|---|---|---|---|
| 2013/0279437 A1* | 10/2013 | Ng | H04W 48/16 370/329 |
| 2014/0022988 A1* | 1/2014 | Davydov | H04B 7/024 370/328 |

OTHER PUBLICATIONS

NTT DOCOMO, "Remaining details for quasi co-location behavior", 3GPP TSG RAN WG1 Meeting #71, New Orleans, USA, Nov. 12, 2012, pp. 1-8, R1-124837, 3GPP.
(Continued)

*Primary Examiner* — Dung B Huynh
*Assistant Examiner* — Brian T Le
(74) *Attorney, Agent, or Firm* — Coats & Bennett, PLLC

(57) ABSTRACT

User Equipment, UE (30), in a wireless radiocommunication network (10) supporting Coordinated Multi-Point, CoMP, transmissions may autonomously adopt an assumption of the quasi co-located (QCL) status of two (or more) antenna ports that is different from the default QCL status defined or signaled by the network (10), in response to one or more estimates of certain operating parameter values. The altered QCL status assumption allows the UE (30) to correct parameter estimates more accurately, and/or to reduce complexity in the parameter estimation correction.

14 Claims, 5 Drawing Sheets

(51) Int. Cl.
H04L 25/02 (2006.01)
H04L 5/00 (2006.01)
H04W 88/08 (2009.01)
H04B 7/06 (2006.01)

(52) U.S. Cl.
CPC ......... H04L 25/0202 (2013.01); H04W 24/08 (2013.01); *H04B 7/0665* (2013.01); *H04B 7/0691* (2013.01); *H04L 5/0051* (2013.01); H04W 88/08 (2013.01)

(56) References Cited

OTHER PUBLICATIONS

Ericsson, "Outstanding Issues for Antenna Ports Quasi Co-location", 3GPP TSG-RASN WG1 #70bis, San Diego, USA, Oct. 8, 2012, pp. 1-12, R1-124547, 3GPP.

* cited by examiner

AUTONOMOUS QUASI CO-LOCATION STATUS REDEFINITION BY RECEIVER IN COORDINATED MULTIPOINT DOWNLINK

TECHNICAL FIELD

The present invention relates generally to wireless communication reception, and in particular to a system and method for autonomously redefining quasi co-location status for antenna points in Coordinated Multipoint downlink transmissions.

BACKGROUND

3$^{rd}$ Generation Partnership Project (3GPP) Long Term Evolution (LTE) technology is a mobile broadband wireless communication technology. A representative LTE network 10 is depicted in FIG. 1. In the LTE network 10, transmissions a base station (also referred to as Evolved NodeB, or eNB) 20 to one or more mobile stations (also referred to as user equipments, or UEs) 30 are sent using orthogonal frequency division multiplexing (OFDM) in the downlink. Uplink transmissions from the UEs 30 to the eNodeB 20 use DFT-spread OFDM. The eNodeBs 20 transfer data and telephony through a core network 40 to and from other networks, such as the Internet 50, the Public Switched Telephone Network (PSTN) 60, or the like.

The basic LTE physical resource can thus be seen as a time-frequency grid as illustrated in FIG. 2, where each resource element corresponds to one subcarrier during one OFDM symbol interval (on a particular antenna port). An antenna port is defined such that the channel over which a symbol on the antenna port is conveyed can be inferred from the channel over which another symbol on the same antenna port is conveyed. See 3GPP TS 36.211, §5.2.1. Typically, an antenna port corresponds to a physical antenna or a combination of physical antennas. There is one resource grid per antenna port.

LTE additionally supports Multiple-input multiple-output (MIMO) operation, in which both transmitter and receiver are equipped with multiple antenna ports, allowing for transmit diversity and closed-loop spatial multiplexing.

In the time domain, LTE downlink transmissions are organized into radio frames of 10 ms, with each radio frame consisting of ten equally-sized subframes of 1 ms, as illustrated in FIG. 3. A subframe is divided into two slots, each of 0.5 ms time duration. The resource allocation in LTE is described in terms of physical resource blocks (PRB), where a resource block corresponds to one slot in the time domain and 12 contiguous 15 kHz subcarriers in the frequency domain. Two consecutive (in time) resource blocks represent a resource block pair and correspond to the time interval upon which scheduling operates.

Transmissions in LTE are dynamically scheduled in each subframe, where the eNodeB 20 transmits downlink assignments/uplink grants to certain UEs 30 via the (enhanced) physical downlink control channel (PDCCH and ePDCCH). The PDCCHs are transmitted in the first OFDM symbol(s) in each subframe and span (approximately) the whole system bandwidth. A UE 30 that has decoded a downlink assignment, carried by a PDCCH, knows which resource elements in the subframe that contain data aimed for the UE 30. Similarly, upon receiving an uplink grant, the UE 30 knows which time/frequency resources it should transmit upon. In LTE downlink, data is carried by the physical downlink shared channel (PDSCH) and in the uplink the corresponding link is referred to as the physical uplink shared channel (PUSCH).

Demodulation of sent data requires estimation of the radio channel, which is done by using transmitted reference symbols (RS), i.e., symbols known a priori by the receiver. In LTE, cell specific reference symbols (CRS) are transmitted in all downlink subframes and, in addition to assisting downlink channel estimation, they are also used for mobility measurements performed by the UEs 30. LTE also supports UE-specific RS aimed only for assisting channel estimation for demodulation purposes, referred to as demodulation reference symbols (DMRS). Because the DMRS is precoded, in MIMO operations, with the same precoding matrix as that used for the PDSCH transmission, the DMRS cannot be used to generate Channel Quality Indicator (CQI), Precoding Matrix Index (PMI), or Rank Indicator (RI) feedback values. Accordingly, another reference signal, referred to as the Channel State Information Reference Signal (CSI-RS), is cell-specific and used by UEs 30 to generate CQI, PMI, and RI. Although the CSI-RS is similar to CRS, the CSI-RS is transmitted much less frequently than CRS.

FIG. 4 illustrates how the mapping of physical control/data channels and signals can be done on resource elements within a downlink subframe. In this example, the PDCCHs occupy the first out of three possible OFDM symbols, so in this particular case the mapping of data could start already at the second OFDM symbol. Since the CRS is common to all UEs 30 in the cell, the transmission of CRS cannot be easily adapted to suit the needs of a particular UE 30. This is in contrast to UE-specific RS which means that each UE 30 has RS of its own placed in the data region of FIG. 4 as part of PDSCH.

Coordinated Multipoint (CoMP) refers to a set of techniques in LTE that enable dynamic coordination of transmission and reception over a variety of different base stations 20. CoMP utilizes the phenomenon of inter-cell interference (ICI) to improve overall quality for UEs 30, particularly at cell borders, and improve utilization of the network. The concept of a transmission point is heavily used in CoMP. In this context, a transmission point (or simply a point) corresponds to a set of antenna ports covering essentially the same geographical area in a similar manner. Thus a point might correspond to one of the sectors at a site, but it may also correspond to a site having one or more antenna ports all intending to cover a similar geographical area. Often, different points represent different sites. Antenna ports correspond to different points when they are sufficiently geographically separated and/or having antenna diagrams pointing in sufficiently different directions. Stated differently, a transmission point is a set of antenna ports that are geographically collocated.

Techniques for CoMP entail introducing dependencies in the scheduling or transmission/reception among different points, in contrast to conventional cellular systems where, from a scheduling point of view, each point is operated substantially independently from the other points. DL CoMP operations may include, e.g., serving a certain UE 30 from multiple points, either at different time instances or for a given subframe, on overlapping or not overlapping parts of the spectrum. Dynamic switching between transmission points serving a certain UE 30 is often referred to as dynamic point selection (DPS). Simultaneously serving a UE 30 from multiple points on overlapping resources is often referred to as joint transmission (JT). The point selection may be based, e.g., on instantaneous conditions of the channels, interference, or traffic. CoMP operations are intended to be performed, e.g., for data (PDSCH) channels and/or control channels such as ePDCCH. Because CoMP downlink transmissions to a particular UE 30 may emanate from points associated with different eNodeBs 20, the UE 30 is generally discussed herein as exchanging information with the network 10, rather than particular eNodeBs 20. Those of skill in the art will readily realize that a UE 30 may transmit information to or from the network 10 via one or more eNodeBs 30.

One of the principles guiding the design of the LTE system is transparency of the network 10 to the UE 30. In other words, the UE 30 is able to demodulate and decode its intended channels without specific knowledge of scheduling assignments for other UEs 30 or network deployments. DMRS or UE-specific RS are employed for demodulation of data channels and possibly certain control channels (ePDCCH). UE-specific RS relieves the UE from having to know many of the properties of the transmission and thus allows flexible transmission schemes to be used from the network side. This is referred to as transmission transparency (with respect to the UE 30).

Geographical separation of RS ports implies that long term channel properties from each port towards the UE 30 are in general different. Example of such long term properties include the received power for each port, the delay spread, the Doppler spread, the received timing (i.e., the timing of the first significant channel tap), the number of significant channel taps, the frequency shift, and the Doppler spread. It is noted that transmitter impairments, such as frequency shift with respect to a nominal reference frequency and propagation delays in the equipment, affect the equivalent channel perceived by the UE. Therefore, RS ports that are physically collocated but associated with significantly different transmitter impairments may be perceived by the UE 30 as having different long term channel properties.

According to the LTE terminology, it is said that two antenna ports are quasi co-located (QCL) with respect to a certain long term channel property X when such long term channel property X may be assumed to be the same for both ports by the UE 30. Conversely, it is said that two antenna ports are not quasi co-located (QCL) with respect to a certain long term channel property X when such long term channel property X shall not be assumed to be the same for both ports by the UE 30.

UEs 30 may exploit knowledge of the QCL assumptions in a number of ways. For example, the complexity of channel estimation algorithms may be reduced by avoiding individual estimation of channel properties that are QCLed between different antenna ports. Another advantage is the possibility of extracting channel properties from certain ports which allow accurate estimation and applying them to other QCLed ports that do not allow equally good estimation. Other applications are also possible, one example being the indication of QCL assumptions between DMRS and CSI-RS. Since estimation of long term channel properties from DMRS is challenging, the DMRS QCL assumptions in LTE allow estimating selected long term channel properties from a signaled CSI-RS resource and applying them to DMRS, to aid DMRS estimation. Other UE 30 implementations might exploit QCL between CSI-RS and DMRS by jointly exploiting certain channel properties from both RS types, and applying them to aid estimation of either or both such RS types.

QCL properties are either defined in the standard or signaled by the network 10 to the UE 30, according to the deployment and propagation scenario. LTE Rel-11 defines QCL of Doppler shift and Doppler spread between CRS, CSI-RS and DMRS. Furthermore, delay spread and propagation delay are QCLed between a CSI-RS resource and DMRS. There are at least three technical problems deriving from this situation.

First, it is impossible to configure correct QCL assumptions when DMRS based transmission occurs from multiple points (i.e., joint transmission on the same resources) which are characterized by different frequency shift and/or propagation delay and/or delay spread. Second, demodulation performance degrades unnecessarily when CRS and/or CSI-RS SINR are low. Third, when compensation of all the above mentioned mismatches is required, the UE complexity increases.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to delineate the scope of the invention. The sole purpose of this summary is to present some concepts disclosed herein in a simplified form as a prelude to the more detailed description that is presented later.

According to one or more embodiments described and claimed herein a UE in a CoMP downlink may autonomously adopt an assumption of the quasi co-located (QCL) status of two (or more) antenna ports that is different from the default QCL status defined or signaled by the network, in response to one or more estimates of certain operating parameter values. The altered QCL status assumption allows the UE to correct parameter estimates more accurately, and/or to reduce complexity in the parameter estimation correction.

One embodiment relates to a method of operating a User Equipment UE in the downlink of a wireless radiocommunication network operative to transmit signals from a plurality of transmission points. Two or more antenna ports are defined or signaled by the network to be quasi co-located (QCL), or not, with respect to a given long term channel property, whereby the antenna ports are QCL if the given long term channel property may be assumed to be the same for both antenna ports by the UE (30). The UE ascertains, by predefinition or signaling from the network, a default QCL status of the first and second antenna ports, and estimates one or more wireless network operating parameters. The UE autonomously adopts an assumption of the QCL status, different from the default QCL status, of the first and second antenna ports, in response to the one or more parameter estimates.

Another embodiment relates to a User Equipment (UE) operative in a wireless radiocommunication network transmitting signals from a plurality of transmission points. Two or more antenna ports are defined or signaled by the network to be quasi co-located (QCL), or not, with respect to a given long term channel property, whereby the antenna ports are QCL if the given long term channel property may be assumed to be the same for both antenna points by the UE. The UE includes radio circuitry operative to receive signals from the network, memory, and processing circuitry operatively connected to the memory and radio circuitry. The processing circuitry operative to ascertain, by predefinition or signaling from the network, a default QCL status of the first and second antenna ports; estimate one or more wireless network operating parameters, and autonomously adopt an assumption of the QCL status, different from the default QCL status, of the first and second antenna ports, in response to the one or more parameter estimates.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

Figure 1:
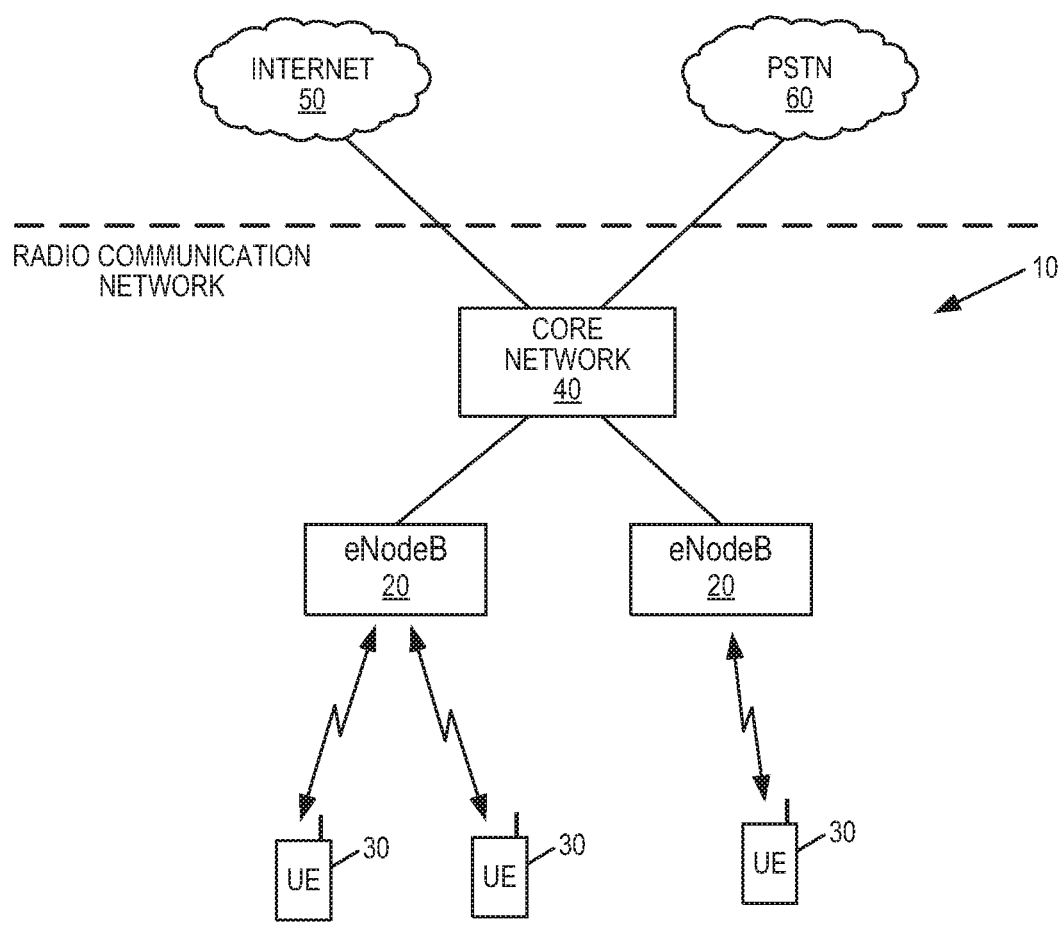
FIG. 1 is a functional block diagram of a Long Term Evolution (LTE) radiocommunication network 10.
Figure 2:
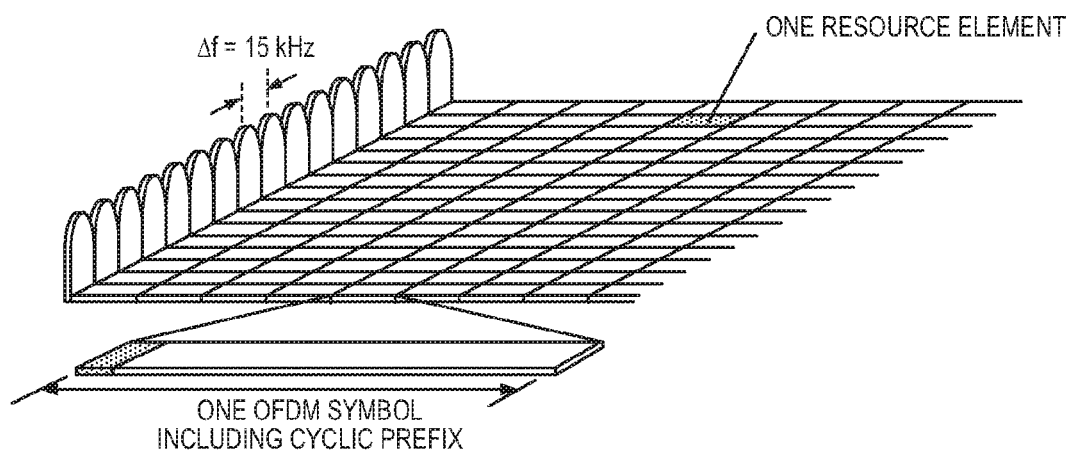
FIG. 2 depicts a LTE downlink physical resource.
Figure 3:
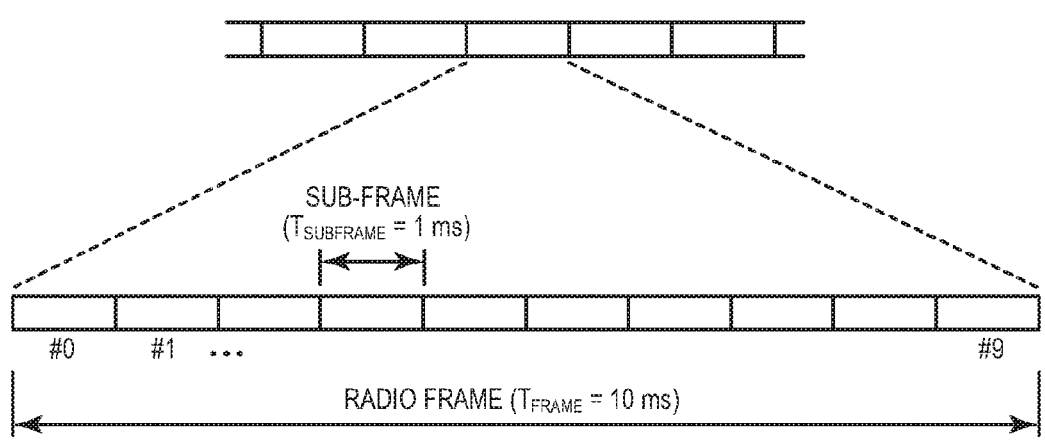
FIG. 3 depicts an LTE time-domain structure.
Figure 4:
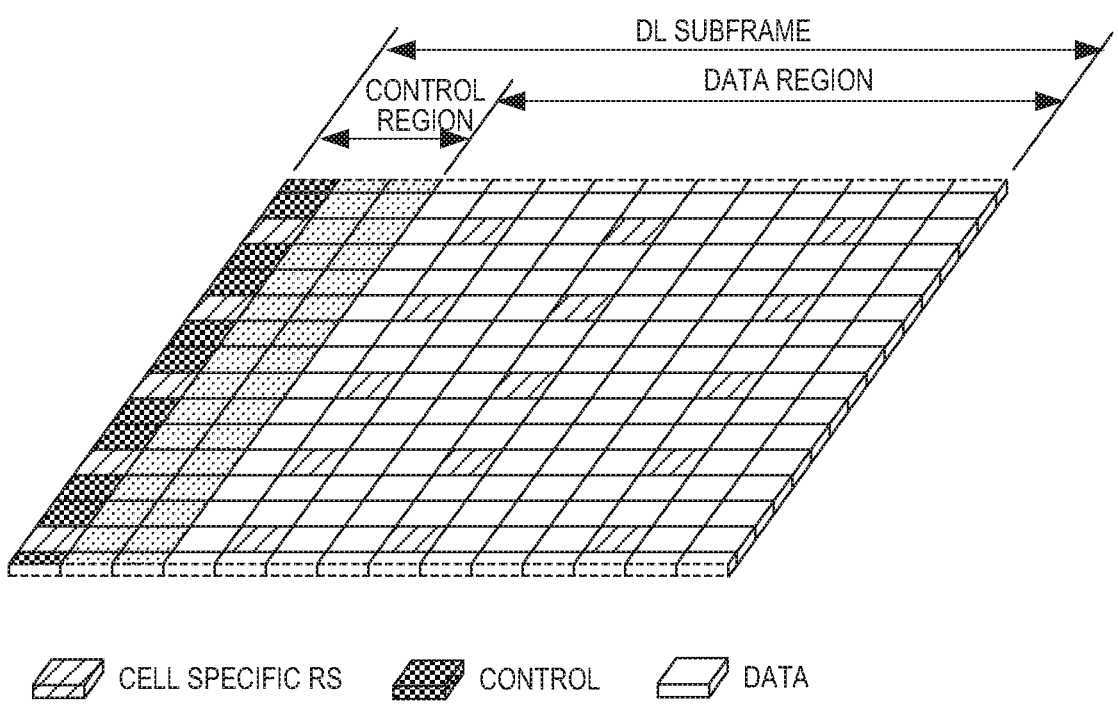
FIG. 4 shows a mapping of LTE physical control signaling, data link and cell specific reference signals within a downlink subframe.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. In particular, although terminology from 3GPP LTE has been used in this specification to exemplify the invention, this should not be seen as limiting the scope of the invention to only the aforementioned system. Other wireless systems, including but not limited to WCDMA, WiMax, UMB and GSM, may also benefit from exploiting the ideas described herein.

One fundamental property of DL CoMP is the possibility to transmit different signals and/or channels from different geographical locations (transmission points). One of the principles guiding the design of the LTE system is transparency of the network 10 to the UE 30. In other words, the UE 30 is able to demodulate and decode its intended channels without specific knowledge of scheduling assignments for other UEs 30 or network 10 deployments. Signaling has been defined in 3GPP in order to make sure that the UE 30 has sufficient information to correctly set its demodulation parameters.

Because of this distributed transmission scheme, the received signal will be characterized by mismatches. For example, the signals transmitted from different transmission points may be (or be perceived as being) received at different timing instants, mainly due the different path lengths between the transmission points and the UE 30. Signals may also be (or be perceived as being) received with different frequency error (due to clock differences at different transmission points and Doppler shifts). Alternatively or additionally, signals may be (or be perceived as being) received with different average channel gain.

It is important that the UE 30 be capable of compensating for the effects of the above-mentioned mismatches in order to set correctly the most important parameters related to the demodulation. In particular, the UE 30 must be able to correctly compensate the timing difference and/or frequency error, and must be able to correctly estimate the SNR depending on which transmission point(s) transmits the data channel.

This leads to a high increased complexity in the UE 30 if good performance must be maintained under typical CoMP scenarios. Additionally, as mentioned above, certain QCL assumptions—referred to herein as default QCL assumptions—are defined by specifications or signaled by the network 10 in order to allow for proper estimation. LTE Rel-11 defines QCL of Doppler shift and Doppler spread between CRS, CSI-RS and DMRS. Furthermore, delay spread and propagation delay are QCLed between a CSI-RS resource and DM RS.

More specifically, in some CoMP scenarios, PDSCH (or ePDCCH) transmission occurs from multi-points, and CRSs are sent by each transmission point, each with a different cell ID. According to the LTE Rel-11 specification, the network 10 signals the QCL assumptions for Doppler shift and Doppler spread, i.e., the network 10 will inform the UE 30 regarding which CRS may be considered as collocated with DMRS and CSI-RS with respect to Doppler shift and Doppler spread. However, if the UE 30 uses this QCL assumption, it will estimate a frequency error based on the signaled CRSs, while the actual frequency error the UE 30 experiences on PDSCH will be different, due to the multi-point transmission strategy.

At least three technical problems deriving from this situation are identified: First, it is impossible to configure correct QCL assumptions when DMRS based transmission occurs from multiple points (joint transmission on same resources) which are characterized by different frequency shift and/or propagation delay and/or delay spread. Second, demodulation performance degrades unnecessarily when CRS and/or CSI-RS SINR are low. Third, the UE complexity increases when compensation of all the above mentioned mismatches is required.

According to an exemplary embodiment, these problems can be solved by, for example, introducing a multi-fold decision region defined such that the UE 30 autonomously optimizes and dynamically changes the default QCL assumptions between two (or more) antenna ports in order to perform proper estimation of timing, frequency error, and average channel gain, and compensates for these mismatches only when it is needed. The decision region can, for example, be determined by a combination of parameters and measurements.

More specifically, the multifold decision region corresponds to a set of conditions, such as for example DMRS SNR, CSR-SNR, modulation, speed, and PDSCH PRB allocation (as discussed more fully herein), according to which the UE 30 dynamically and autonomously changes the default QCL assumptions in order to properly estimate the parameters and perform proper compensation. Additionally, these embodiments limit the complexity in the UE 30 but still guarantee high demodulation performance under CoMP (that is, no performance loss compared to the full complexity UE 30 behavior).

Thus, embodiments provide for dynamically switching QCL assumptions for a RS port depending on the resources associated to such RS port, or to a channel to be demodulated by exploiting such RS port. Such dynamic switching may, for example, be based on signaling from the network 10 to the UE 30 (e.g., by scheduling grants or RRC messages) or it may be autonomous in the UE 30.

One specific application of such embodiments is enhanced and/or simpler channel estimation based on DL DMRS (associated, e.g., to PDSCH or ePDCCH reception). In this case, switching between different QCL behaviors is determined by one or more of the following parameters and/or measurements: CRS SNR, CSI-RS SNR, DMRS SNR, System bandwidth, PDSCH PRB allocation, ePDCCH PRB allocation, Modulation, Transmission rank, Coding Rate, Modulation and Coding Scheme (MCS), Nominal spectral efficiency for the associated scheduled transmission, Single/Multi point DMRS transmission, Reference Signal Received Power (RSRP) and/or Reference Signal Received Quality (RSRQ) measurements for a given cell, including a non-serving cell. Other parameters and/or measurements may of course be considered as switching criteria. It is noted that the above parameters/measurements should be known at least by the UE 30 prior to the decision on which QCL assumption should be used.

One fundamental observation associated with these embodiments is that some long term channel properties may be efficiently estimated for a certain RS type (e.g., DM RS) only when the SNR (or SINR) is sufficiently good and the scheduled bandwidth (BW) is sufficiently large. It is also observed that the required BW is actually a function of the SNR or SINR. Other parameters may also contribute, to a lesser extent, to estimation accuracy. On the other hand, in the general case, certain RS such as DM RS do not have a structure that allows for accurate parameters estimation; therefore QCL assumptions with other RS are needed to improve DMRS-based channel estimation.

This problem may be solved by dynamic optimization of the QCL assumptions—specific examples of which are described in numbered embodiments of the present invention.

Embodiment 1

In a first basic embodiment, the UE 30 autonomously, after estimation of a certain set of parameters (e.g., PDSCH PRB allocation, and/or other switching criteria explained in the following), adapts the QCL assumptions in order to optimize performance, or to reduce complexity while maintaining optimal performance. Note that the phrase "set of parameters" can include a set having one or more parameters. One or more of the following sub-variants can be used in conjunction with this general first embodiment.

Embodiment 1.1

Under the conditions of embodiment 1, the UE 30 sends a capability bit to indicate the support of this autonomous, dynamic optimization of the QCL assumptions.

This allows the network 10 to adapt its decisions on transmission schemes to be scheduled. The network 10 may be aware of the QCL assumptions definitions A and B in embodiment 1.3 described below, as well as of the QCL switching criteria, and can exploit this in order to increase the deployment freedom.

Embodiment 1.2

Under the conditions of embodiments 1, or 1.1, the network 10 may reconfigure the QCL assumptions as well as the corresponding triggering criteria in the UE 30.

Embodiment 1.3

Under the condition of embodiments 1, 1.1, or 1.2 at least the following QCL assumptions for CRS are present:
A: Default Rel-11 QCL assumptions (i.e., CRS, CSI-RS and DMRS are QCL with respect to certain long term channel properties), and
B: DMRS shall not be assumed as QCL with any other RS.

Embodiment 1.3 can also define a triggering criterion for QCL assumption B, e.g., the UE 30 adopts QCL assumption B when the associated PDSCH BW is larger than 2 PRBs. Other triggering criteria are of course possible, as discussed further below. Similarly, other definitions of assumption B are possible. As with other QCL assumptions, individual long term channel properties may be collocated between different RS types in the definition of assumption B and additional assumptions may be introduced. When the triggering criteria apply, the UE 30 ignores the default QCL assumption that CRSs are QCLed with DMRSs and will use assumptions B instead. One important point is to define triggering conditions such that the UE 30 does not need to rely on QCL of DMRS with other RS when such triggering conditions apply. Using this embodiment, the network 10 can deploy PDSCH multipoint transmission, even when CRSs are sent independently from the different transmission points, without any joint processing, without loss in performance. The network 10 preferably performs multipoint transmission only when the triggering condition(s) for assumption B apply.

Embodiment 1.4

Under the conditions of embodiment 1, the UE 30 does not inform the network 10 about the dynamic QCL adaptation and the network 10 is not aware that the UE 30 performs dynamic QCL assumptions switching. In other words, the QCL assumptions A and B (and possibly others), as well as the switching criteria, are autonomously defined by the UE 30. If the UE 30 applies embodiment 1.4 correctly, multipoint transmission is still applicable on the network 10 side, as it is shown by simulation results that sensitivity to at least incorrect frequency shift is only critical at medium-high SNR levels, i.e., the SNR levels at which the UE 30 should apply assumption B. At low SNR levels, the UE 30 would need to exploit QCL between DM RS and other RS types (assumption A) but the performance loss due to inaccurate channel properties estimation due to multipoint combining would be limited.

A second problem mentioned above associated with the use of default QCL assumptions occurs when the CRSs or CSI-RSs are received with very low SNR, compared to DMRSs. In this case, demodulation performance of DMRS based transmission degrades. This problem is addressed by embodiment of the present invention described below.

Embodiment 2

In a second basic embodiment, the UE 30 autonomously, after estimation of certain parameters (e.g., CRS SNR, CSI-RS SNR, DMRS SNR, System bandwidth, and/or other switching criteria), adapts QCL assumptions in order to optimize performance or to reduce complexity while maintaining optimal performance.

Embodiment 2.1

Under the conditions of embodiment 2, the UE 30 sends a capability bit to indicate the support of this autonomous, dynamic optimization of the QCL assumptions. This allows the network 10 to adapt its decisions on transmission schemes to be scheduled. The network 10 is aware of the QCL assumptions A and B in Embodiment 2.3 described below, as well as of the QCL switching criteria, and can exploit this in order to increase the deployment freedom.

Embodiment 2.2

Under the conditions of embodiment 2 or 2.1, the network 10 may reconfigure the QCL assumptions as well as the corresponding triggering criteria in the UE.

Embodiment 2.3

This is similar to embodiment 1.3 describe above, and may employ similar QCL assumptions A and B. One difference between embodiment 1.3 and embodiment 2.3 is that in embodiment 2.3, only QCL between CRS and DMRS (and possibly CSI-RS) is removed in assumption B. Another difference is that the triggering conditions should in some way capture whether CRS are of sufficient quality (or if they are necessary at all) to support accurate estimation of other RS for the UE 30.

Embodiment 2.4

Under this embodiment the network 10 is not aware that the UE 30 performs dynamic switching of QCL assumptions, or that the UE 30 autonomously decides on appropriate QCL assumptions and switching criteria.

Other embodiments are also contemplated.

Embodiment 3

Under the conditions of the embodiments 1, 1.1, 1.2, 1.4, 2, 2.1, 2.2 or 2.4, a triggering criterion based on DMRS SNR can be defined such that if DMRS SNR is sufficiently small, then QCL assumption A described above in embodiment 1.3 can be used—that is, the UE 30 can assume only certain QCL assumptions. This highly reduces the complexity in the UE as no error compensation is required.

Embodiment 4

In a fourth basic embodiment, the UE 30 does not optimize the QCL assumptions autonomously, but the assumptions are signaled to the UE 30 by the eNodeB 20 after estimation of the following UE parameters: CRS SNR, CSI-RS SNR, DMRS SNR, and/or Modulation. Note that the eNodeB 20 knows the System bandwidth, UE-specific PDSCH PRB allocation and UE-specific modulation, and the transmission scheme used for PDSCH single or multipoint PDSCH transmission).

Embodiment 4.1

Under the conditions of embodiment 4, when the SNR on DMRS is smaller than a certain threshold (e.g., the CQI is lower than a certain threshold) the network signals assumption A. This highly reduces the complexity in the UE 30 as no error compensation is required.

Embodiment 4.2

Under the conditions of embodiment 4, the same embodiments as 1.3 and 2.3 are applicable.

Various criteria to be used for QCL assumption switching are described above. Other may additionally be considered.

For example, one switching algorithm takes into account the nominal spectral efficiency for the transmission associated to DMRS. Such spectral efficiency is given by a combination of the modulation order, the coding rate, and the MIMO multiplexing gain (rank). The reason for this criterion is that the nominal spectral efficiency typically reflects the expected quality of the data channel.

As another example criterion, spectral efficiency is combined with special conditions on the rank. For example, for certain rank values it is not practical to estimate Doppler shift and Doppler spread from DMRS, because the DMRS structure depends on the corresponding rank.

As one illustrative example of the foregoing embodiments, which are associated with modifying/changing/adapting QCL assumptions under various conditions, an example of a QCL assumption changing algorithm is provided for modulations such as QPSK and 16QAM. The exemplary algorithm described below can be generalized for 64QAM, as well as for specific estimation purposes (e.g., timing and frequency errors).

In the pseudocode example below, the considered parameters of the decision region are the following, in this order: {CRS SNR, CSI-RS SNR, DMRS SNR, System bandwidth (B), PDSCH PRB allocation, Modulation, Single point or Multipoint PDSCH TX}. In the pseudocode, 'Any' means independency with respect to the particular parameter, i.e., this parameter can take any value. Also, '>x' and '<x' mean that the condition is verified if the parameter is larger or smaller than x, respectively. Additionally, in the following pseudocode example, some subroutines are executed which perform the following functions:

FREQUENCY/TIMING DMRS: The frequency/timing error estimation is done by considering solely DMRS resources.

FREQUENCY/TIMING CSI-RS: The frequency/timing error estimation is done by considering solely CSI-RS resources.

FREQUENCY CRS: The frequency error estimation is done by considering solely signaled CRS resources.

FREQUENCY XXRS+YYRS: The frequency error estimation is done by jointly exploiting the use of)(ARS and YYRS, where)(ARS and YYRS can be CSI-RS, DMRS and/or CRS resources.

Pseudocode Examples

If {ANY, ANY, ANY, ANY, ANY, QPSK, ANY}

Follow legacy assumption A and do not perform any compensation

That is, for QPSK modulation, but under any condition of CRS SNR, CSI-RS SNR, DMRS SNR, System bandwidth, PDSCH PRB allocation, or whether single- or multi-point PDSCH transmission, the UE should follow assumption A and not perform any compensation.

If {ANY, ANY, DMRS SNR<$T_{DMRS\ SNR}$, ANY, ANY, 16QAM, Single point PDSCH Tx}

Follow legacy assumption A and do not perform any compensation.

If {CRS SNR>TCRS-SNR, 16QAM, 5 MHz, ANY, DMRS SNR>T$_{DMRS\ SNR}$, B>B$_{minMHz}$, ANY, 16QAM, Single point PDSCH Tx}

Assume signaled CSI-RS resource and DMRSs are collocated for time estimation. Use algorithm 'TIMING CSI-RS'

Assume signaled CRSs and DMRSs are collocated for frequency estimation. Use algorithm 'FREQUENCY CRS'

No QCL assumptions for SNR estimation. Use algorithm 'SNR DMRS'

If {CRS SNR<TCRS-SNR, 16QAM, 5 MHz, ANY, DMRS SNR>T$_{DMRS\ SNR}$, B>B$_{minMHz}$, Allocation>F$_{PRB}$, 16QAM, Single point PDSCH Tx}

Assume signaled CSI-RS resource and DMRSs are collocated for time estimation. Use algorithm 'TIMING CSI-RS'

Assume no QCL for frequency estimation. Use algorithm 'FREQUENCY DMRS', or 'FREQUENCY CSI-RS' or 'FREQUENCY CSI-RS+DMRS'

No QCL assumptions for SNR estimation. Use algorithm 'SNR DMRS'

If {CRS SNR<T$_{CRS-SNR}$, 16QAM, 5 MHz, ANY, DMRS SNR>T$_{DMRS\ SNR}$, B>B$_{minMHz}$, Allocation<F$_{PRB}$, 16QAM, Single point PDSCH Tx}

Assume signaled CSI-RS resource and DMRSs are collocated for time estimation. Use algorithm 'TIMING CSI-RS'

Assume no QCL for frequency estimation. Use algorithm 'FREQUENCY CSI-RS' or 'FREQUENCY CSI-RS+DMRS'

No QCL assumptions for SNR estimation. Use algorithm 'SNR DMRS'

If {CRS SNR<T$_{CRS-SNR}$, 16QAM, 5 MHz, ANY, DMRS SNR>T$_{DMRS\ SNR}$, B<B$_{minMHz}$, Allocation>F$_{PRB}$, 16QAM, Single point PDSCH Tx}

Assume signaled CSI-RS resource and DMRSs are collocated for time estimation. Use algorithm 'TIMING DMRS' or 'TIMING DMRS+CSI-RS'

Assume no QCL for frequency estimation. Use algorithm 'FREQUENCY DMRS' or 'FREQUENCY CSI-RS+DMRS'

No QCL assumptions for SNR estimation. Use algorithm 'SNR DMRS'

If {CRS SNR<T$_{CRS-SNR}$, 16QAM, 5 MHz, ANY, DMRS SNR>T$_{DMRS\ SNR}$, B<B$_{minMHz}$, Allocation<F$_{PRB}$, 16QAM, Single point PDSCH Tx}

Assume signaled CSI-RS resource and DMRSs are collocated for time estimation. Use algorithm 'TIMING DMRS' or 'TIMING DMRS+CSI-RS'

Assume no QCL of CRS with DMRS for frequency estimation. Use algorithm 'FREQUENCY DMRS' or 'FREQUENCY CSI-RS+DMRS'

No QCL assumptions for SNR estimation. Use algorithm 'SNR DMRS'

If {ANY, ANY, ANY, B>B$_{minMHz}$, Allocation>F$_{PRB}$, 16QAM, Multi point PDSCH Tx}

Assume signaled CSI-RS resource and DMRSs are collocated for time estimation. Use algorithm 'TIMING CSI-RS' or 'TIMING DMRS' or 'TIMING DMRS+CSI-RS'

Assume no QCL of CRS with DMRS for frequency estimation. Use algorithm 'FREQUENCY CSI-RS+DMRS'

No QCL assumptions for SNR estimation. Use algorithm 'SNR DMRS'

If {ANY, ANY, ANY, B>B$_{minMHz}$, Allocation>F$_{PRB}$, 16QAM, Multi point PDSCH Tx}

Assume signaled CSI-RS resource and DMRSs are collocated for time estimation. Use algorithm 'TIMING CSI-RS' or 'TIMING DMRS' or 'TIMING DMRS+CSI-RS'

Assume no QCL of CRS with DMRS for frequency estimation. Use algorithm 'FREQUENCY CSI-RS+DMRS'

No QCL assumptions for SNR estimation. Use algorithm 'SNR DMRS'

Among other benefits or advantages, methods and algorithms according to these embodiments enable the network to deploy PDSCH multipoint transmission even when CRSs are sent independently from the different transmission points, without any joint processing and without loss in performance, hence allowing for network deployment freedom. Moreover, this autonomous algorithm allows for network deployment freedom of CoMP transmission schemes, which can be deployed also when high interference is present on CRSs, which limits the use of CRS frequency shifting.

Figure 5:
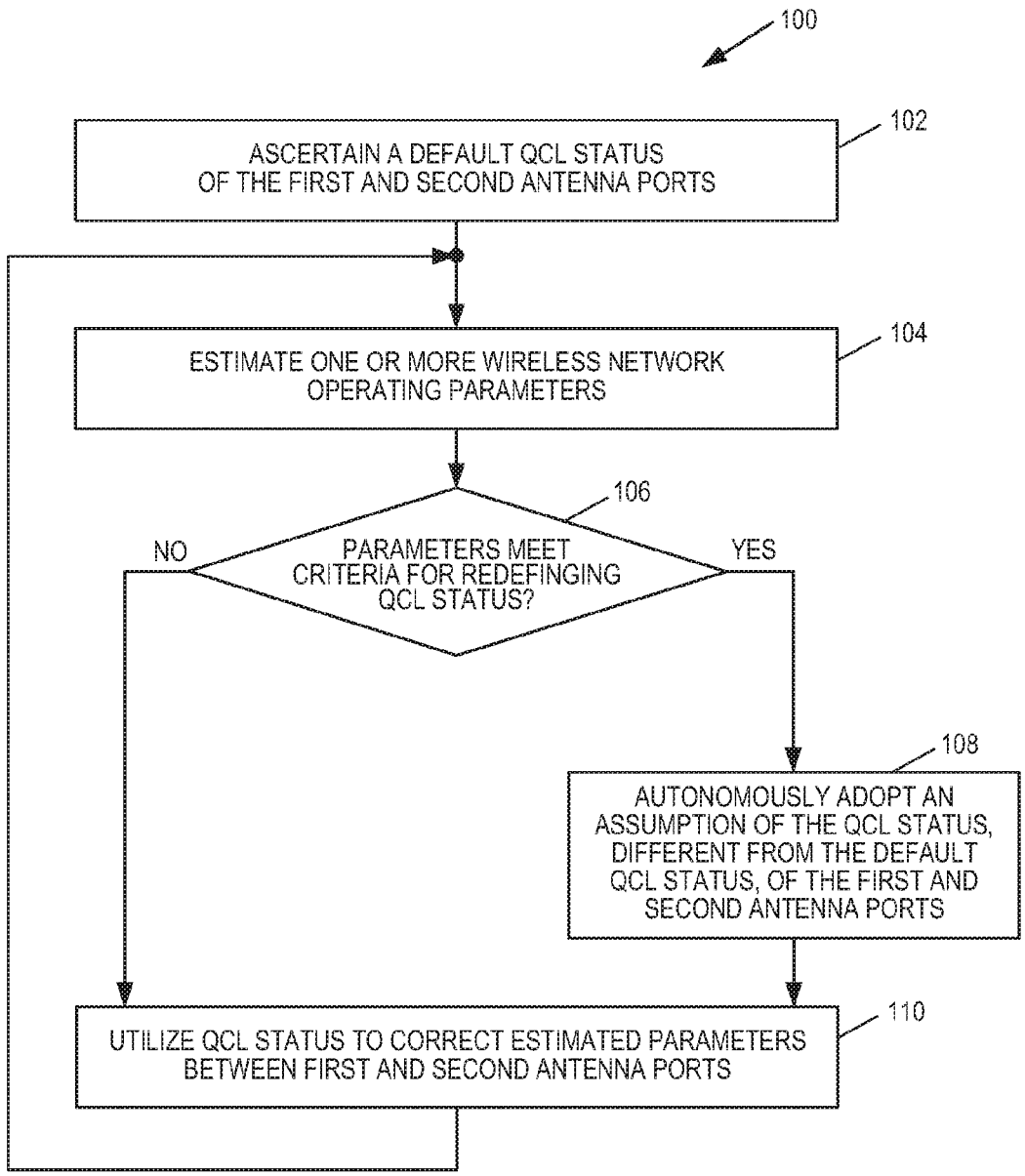
FIG. 5 is a flow diagram of a method of operating a UE 30 in an LTE network.

FIG. 5 depicts a flow diagram of a method 100 of operating a UE 30 in a network 10 operative to transmit signals from a plurality of antenna ports. The method 100 is described with respect to two arbitrary antenna ports, denoted first and second ports, but of course may apply to multiple pairs (or other combinations) of antenna ports. Initially, the UE 30 ascertains a default QCL status of the first and second antenna ports (block 102). The default QCL status may be defined, e.g., in LTE technical specifications such as Rel. 11, or may be signaled to the UE 30 by the network 10, such as via System Information broadcasts.

During its normal operation, the UE 30 estimates a variety of network operating parameters (block 104). These may include, for example, CRS SNR, CSI-RS SNR, DMRS SNR, System bandwidth, PDSCH PRB allocation, ePDCCH PRB allocation, Modulation, Transmission rank, Coding Rate, Modulation and Coding Scheme (MCS), Nominal spectral efficiency for the associated scheduled transmission, Single/Multi point DMRS transmission, Reference Signal Received Power (RSRP) and/or Reference Signal Received Quality (RSRQ) measurements for a given cell, including a non-serving cell.

In response to the estimated network parameters—that is, if particular estimated network parameter values meet predefined criteria (block 106), the UE 30 autonomously adopts an assumption of the QCL status of the first and second antenna ports that is different from the default QCL status (block 108). For example, the UE 30 may adopt assumptions A or B described hereinabove, or variations thereof, or other QCL assumptions.

The UE 30 then corrects estimated parameters, utilizing the QCL status (block 110). If the network operating parameters did not meet predefined criteria for QCL status redefinition (block 106), the default QCL status is used (block 110). However, if the relevant network operating parameters met predefined criteria for QCL status redefinition (block 106), and a different set of assumptions regarding the QCL status were autonomously adopted by the UE 30 (block 108), then the newly adopted QCL status is used for parameter estimation correction (block 110).

In this manner, the UE 30 may cure known deficiencies in the default QCL status situation of the prior art—e.g., the impossibility of configuring correct QCL assumptions when DMRS based transmission occurs from multiple transmission points that are characterized by different frequency shift and/or propagation delay and/or delay spread, and/or the degradation of demodulation performance when CRS and/or CSI-RS SINR is low. Furthermore, the UE 30 may improve its parameter estimation performance, or maintain high parameter estimation performance while simplifying the required computational complexity. In embodiments in which the UE 30 communicates this capability to the network 10, the network 10 may exploit the UE 30 QCL redefinition capability in order to increase the deployment freedom.

The foregoing embodiments provide for methods 100 and systems for modifying, adapting or changing QCL status assumptions in a radio communication system. These embodiments may impact the user equipments (UEs) 30, network nodes (e.g., eNodeBs) 20 or both. Thus an exemplary network node 20 and UE 30 in which these embodiments can be implemented are illustrated in FIGS. 9 and 10, respectively.

Figure 6:
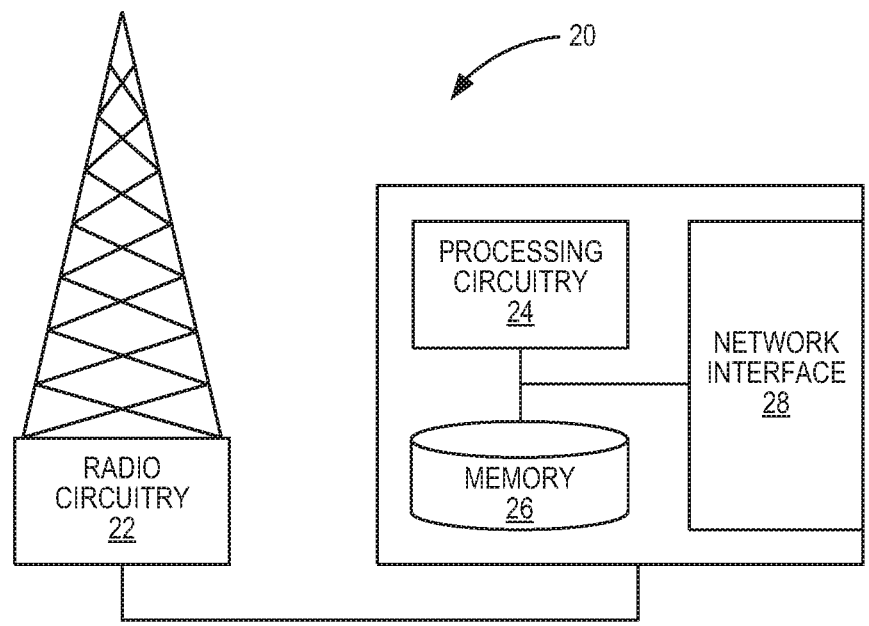
FIG. 6 is a functional block diagram of an eNodeB 20.

FIG. 6 illustrates a transmitting node 20, e.g., a network node such as an eNodeB, for transmitting an information carrying signal to a receiving node 30, e.g., a UE. The transmitting node 20 comprises processing circuitry 24, and is connectable to radio circuitry 22 for communicating with the receiving node 30 in a wireless communications network 10 configured to apply CoMP techniques, wherein a plurality of transmission configurations, also denoted transmit configurations, are available for transmitting said information carrying signal via said radio circuitry 22 to said receiving node 30. In some variants, the radio circuitry 22 is comprised in the transmitting node 20, whereas in other variants, the radio circuitry 22 is external. For example, the radio circuitry 22 can reside in distributed transmission points, which are not physically co-located with the transmitting node 20. Alternatively, if the transmission points correspond to sector antennas at the transmitting node, e.g. the eNodeB 20, then in this case the radio circuitry 22 may be comprised in the transmitting node 20.

The transmitting node 20 comprises a memory 26, a network interface 28 for communicating with other network nodes 20, and processing circuitry 24. According to some embodiments, e.g., wherein the network node 20 is involved in the QCL assumption change process, the processing circuitry 24 is configured to determine QCL assumption changes as described above, and to transmit information associated with QCL assumption changes and/or receive information associated with QCL assumption changes.

Figure 7:
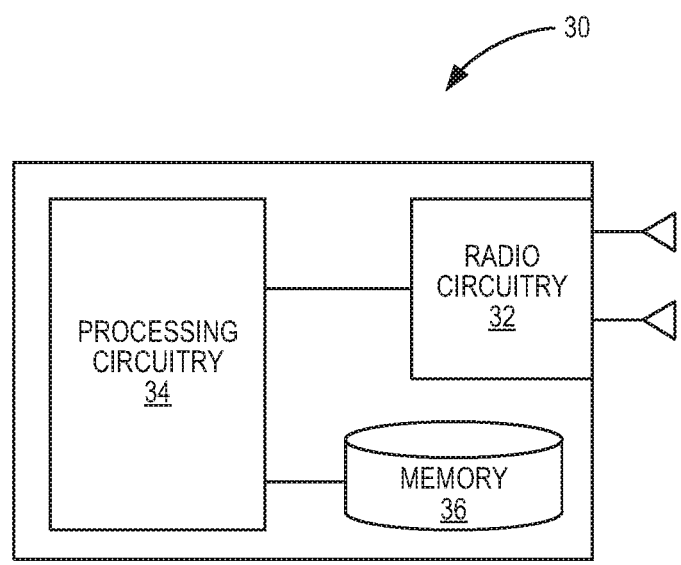
FIG. 7 is a functional block diagram of a UE 30.

FIG. 7 depicts a receiving node 30 for receiving an information carrying signal from a transmitting node 20. The receiving node 30 comprises radio circuitry 32 and processing circuitry 34 and is configurable to communicate with the transmitting node 20 in a wireless communications network 10 configured to apply CoMP, wherein a plurality of transmission configurations, also denoted transmit configurations, are available for transmitting the information carrying signal to said receiving node 30. The processing circuitry 34 is configured, for some embodiments, to autonomously determine whether or not to adjust a current/default QCL assumption. According to other embodiments, the receiving node 30 can receive information from the network node 20 regarding whether or how to change QCL assumptions as described above.

The processing circuitry 24, 34 may comprise one or several microprocessors, digital signal processors (DSP), and the like, as well as other digital hardware and a memory 26, 36. The memory 26, 36, which may comprise one or several types of memory such as read-only memory (ROM), random-access memory (RAM), cache memory, flash memory devices, optical storage devices, or the like, stores program code for executing one or more telecommunications and/or data communications protocols and for carrying out one or more of the techniques described herein. The network node memory 26 further stores program data and user data received from the receiving node 30. Not all of the steps of the techniques described herein are necessarily performed in a single microprocessor 24 or even in a single module.

It should be understood that this description is not intended to limit the invention. On the contrary, the exemplary embodiments are intended to cover alternatives, modifications and equivalents, which are included in the broad scope of the invention. Further, in the detailed description of the exemplary embodiments, numerous specific details are set forth in order to provide a comprehensive understanding of the invention. However, one skilled in the art would understand that various embodiments may be practiced without such specific details, or using different values, parameters, or features than those illustrated.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed circuit such as a computer or processor.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of operating a User Equipment (UE) in a downlink of a wireless radiocommunication network operative to transmit signals from a plurality of transmission points, wherein first and second antenna ports are defined or signaled by the network to be quasi co-located (QCL), or to not be quasi-co-located, with respect to a given long term channel property, whereby the first and second antenna ports are QCL if the given long term channel property may be assumed to be the same for both the first and second antenna ports by the UE, the method comprising:

ascertaining, by predefinition or signaling from the network, a default QCL status of the first and second antenna ports;

estimating, by the UE, one or more wireless network operating parameters; wherein the estimating comprises estimating one or more of the signal to noise ratio (SNR) of received cell-specific reference signals (CRS), received channel state information reference signals (CSI-RS), or received demodulation reference signals (DMRS);

autonomously adopting an assumption of a QCL status, different from the default QCL status, of the first and second antenna ports, in response to the one or more wireless network operating parameters.

2. The method according to claim 1, further comprising signaling to the network that the UE is capable of autonomously adopting the assumption of the QCL status of the first and second antenna ports.

3. The method according to claim 1, further comprising receiving from the network a configuration of QCL assumptions to be adopted in response to the one or more wireless network operating parameters.

4. The method according to claim 1, further comprising receiving from the network an identification of the one or more wireless network operating parameters on which to base the autonomous adoption of the QCL status assumption.

5. The method according to claim 1, wherein the QCL status assumption autonomously adopted is that cell-specific reference signals (CRS), channel state information reference signals (CSI-RS), and demodulation reference signals (DMRS) are QCL with respect to certain long term channel properties.

6. The method according to claim 1, wherein the QCL status assumption autonomously adopted is that demodulation reference signals are not QCL with CRS.

7. The method according to claim 1, wherein:
estimating the one or more wireless network operating parameters comprises estimating the SNR of DMRS;
wherein the QCL status assumption autonomously adopted is that CRS, CSI-RS, and DMRS are QCL with respect to certain long term channel properties.

8. A User Equipment (UE) operative in a wireless radio-communication network transmitting signals from a plurality of transmission points, wherein first and second antenna ports are defined or signaled by the network to be quasi co-located (QCL), or to not be quasi co-located, with respect to a given long term channel property, whereby the first and second antenna ports are QCL if the given long term channel property may be assumed to be the same for both the first and second antenna ports by the UE, the UE comprising:
radio circuitry operative to receive the signals from the network;
memory; and
processing circuitry operatively connected to the memory and the radio circuitry, the processing circuitry operative to:
ascertain, by predefinition or signaling from the network, a default QCL status of the first and second antenna ports;
estimate one or more wireless network operating parameters by estimating one or more of the signal to noise ratio (SNR) of received cell-specific reference signals (CRS), received channel state information reference signals (CSI-RS), or received demodulation reference signals (DMRS);
autonomously adopt an assumption of a QCL status, different from the default QCL status, of the first and second antenna ports, in response to the one or more wireless network operating parameters.

9. The UE according to claim 8, wherein the processing circuitry is further operative to signal to the network that the UE is capable of autonomously adopting the assumption of the QCL status of the first and second antenna ports.

10. The UE according to claim 8, wherein the radio circuitry is operative to receive from the network a configuration of QCL assumptions to be adopted in response to the one or more wireless network operating parameters.

11. The UE according to claim 8, wherein the radio circuitry is operative to receive, from the network, an identification of the one or more wireless network operating parameters on which to base the autonomous adoption of the QCL status assumption.

12. The UE according to claim 8, wherein the QCL status assumption autonomously adopted is that cell-specific reference signals (CRS), channel state information reference signals (CSI-RS), and demodulation reference signals (DMRS) are QCL with respect to certain long term channel properties.

13. The UE according to claim 8, wherein the QCL status assumption autonomously adopted is that demodulation reference signals are not QCL with CRS.

14. The UE according to claim 8, wherein:
the processing circuitry is operative to estimate the one or more wireless network operating parameters by estimating the SNR of DMRS;
the QCL status assumption autonomously adopted is that CRS, CSI-RS, and DMRS are QCL with respect to certain long term channel properties.

* * * * *